Jan. 7, 1969  K. W. McCLENDON  3,420,382
TRANSFERABLE ELECTRIC METER HOLDER AND METHOD
Filed Dec. 21, 1966
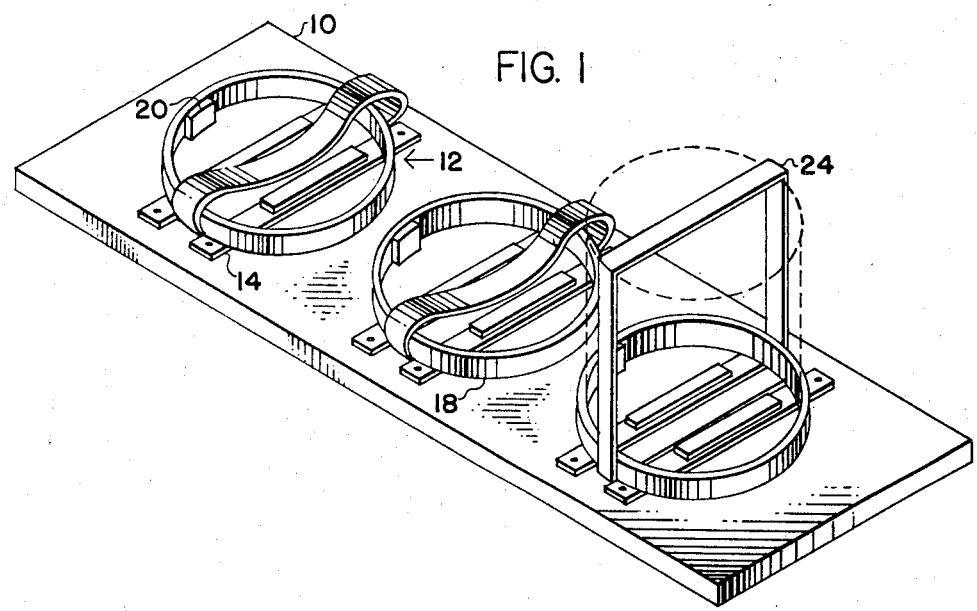
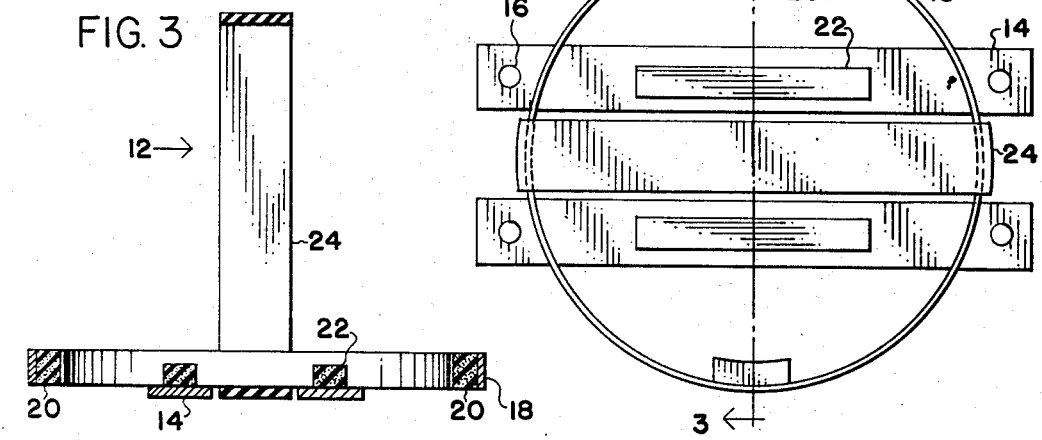
INVENTOR:
KENNETH WAYNE McCLENDON
BY:

United States Patent Office 3,420,382
Patented Jan. 7, 1969

3,420,382
TRANSFERABLE ELECTRIC METER HOLDER AND METHOD
Kenneth Wayne McClendon, P.O. Box 44, Abernathy, Tex. 79311
Filed Dec. 21, 1966, Ser. No. 603,532
U.S. Cl. 211—26                                        3 Claims
Int. Cl. A47f 7/00

ABSTRACT OF THE DISCLOSURE

One or more electric meters are attached securely by rubber bands to a holder which is cushioned with foam rubber. The meters on the holder are then transferable from one vehicle or carrier to another or to a shop.

---

This invention relates to transferring electric meters and more particularly for a holder for transferring said electric meters, said holder itself being transferable from one carrier to another.

In the servicing of electric meters it is often necessary to transport the meter from one location to another. This transportation is usually accomplished with a small truck. Customarily, this truck has a special body attached to it for carrying the special tools, equipment, supplies, etc. used in the business.

In the present state of development of the art there is not available a holder for holding the meter being moved, the holder itself being readily transferable from one carrier or truck body to another.

An object of this invention is to provide a transferable electric meter holder.

Other objects are to achieve the above with a device that is sturdy, compact, durable, simple, versatile, and reliable, yet inexpensive and easy to manufacture and use.

Further objects are to achieve the above with method that is rapid, inexpensive, and does not require skilled people to operate.

The specific nature of the invention as well as other objects, uses, and advantages thereof will clearly appear from the following description and from the accompanying drawing, the different views of which are not necessarily to the same scale, in which:

FIG. 1 is a perspective view of a tray of meter holders, one meter holder being illustrated with a phantom meter therein.

FIG. 2 is a top plan view of one meter holder.

FIG. 3 is a cross sectional view of one meter holder taken on line 3—3 of FIG. 2.

Referring to the drawings it may be seen the holders are attached to shelf 10 which may be either wood or metal. The shelf is readily adapted to be attached onto the special body of the carrier. Also the shelf with attached holders 12 form a try which can be moved as a unit from the carrier to a workshop and back again to a second carrier. The shelf 10 and the associated individual holders 12 form a tray unit which itself is readily movable.

Each holder 12 includes two flat metal straps 14. Each strap has hole 16 in each end thereof for screws or other wood fasteners whereby the strap may be attached parallel and flat against the top to the shelf 10.

Circular metal ring 18 is attached as by welding to the top of the straps 14. The ring extends upward from the straps. The ring is slightly larger in diameter than the meter to be transported. Cushioning resilient pads 20 in the form of sponge rubber are attached to the inside of the ring 18 by suitable adhesive. Cushioning resilient pads 22 in the form of sponge rubber are attached to the top of straps 14 within the ring 18. Thus a meter placed within the ring 18 on top of the straps 14 is resiliently supported within the holder.

To securely attach the meter within the holder it is strapped in place by elastic band 24 in the form of a band of rubber. The band 24 encircles the ring 18 diametrically. The band 24 extends between the straps 14. Inasmuch as the straps are secured to the top of the shelf 10, the band 24 is attached to the ring so that it cannot be lost off of the ring.

The individual holders 12 are readily attached or removed from the particular shelf 10 by four screws through the holes 16. The tray as a unit is readily attached or removed from its carrier.

Thus it may be seen that I have provided a simple method for the transporting of electrical meters.

It will be apparent that embodiment shown is only exemplary and that various modifications can be made in construction, materials, and arrangement within the scope of the invention as defined in the appended claims.

I claim as my invention:

1. An electric meter tray which is transferable from one carrier to another comprising:
   (a) a shelf,
   (b) a plurality of holders on the shelf, each holder having
   (c) two flat straps attached by
   (d) fasteners to the top of the shelf,
   (e) a circular ring attached to the top of the straps,
   (f) resilient cushioning pads attached to the top of the straps within the ring,
   (g) additional resilient cushioning pads attached to the inside of the ring, and
   (h) an elastic band extending diametrically around the ring,
   (j) said band extending between said two flat straps,
   (k) whereby an electric meter may be rested on the straps, coaxially in the ring, and held in place by the elastic band.

2. The invention as defined in claim 1 with the additional limitations of:
   (m) said straps and ring are metal,
   (n) said cushioning pads are sponge rubber,
   (o) said elastic band is rubber, and
   (p) said shelf is wood.

3. A holder for transferring electric meters from one location to another, said holder adapted to be mounted onto a shelf, said holder comprising:
 (a) two flat parallel metal straps,
 (b) each strap having a hole in each end thereof for attaching said holder to a supporting shelf,
 (c) a metal ring welded to the flat straps,
 (d) said ring extending upward from said straps,
 (e) cushioning, resilient, sponge rubber pads adhered to the inside of the ring,
 (f) additional cushioning, resilient, sponge rubber pads adhered to the top of the straps within the ring, and
 (g) an elastic, rubber band diametrically encircling the ring between the parallel straps.

References Cited

UNITED STATES PATENTS

| | | | |
|---|---|---|---|
| 2,688,239 | 9/1954 | Novak | 248—154 X |
| 2,715,005 | 8/1955 | Hildebrand | 248—154 |
| 2,923,512 | 2/1960 | Campbell | 248—361 X |
| 3,055,506 | 9/1926 | Moorhead | 211—26 |
| 3,266,765 | 7/1966 | Campbell | 248—154 X |

CHANCELLOR E. HARRIS, *Primary Examiner.*

U.S. Cl. X.R.

211—74; 248—361, 311; 108—26